(12) United States Patent
Smith et al.

(10) Patent No.: US 11,923,896 B2
(45) Date of Patent: Mar. 5, 2024

(54) OPTICAL TRANSCEIVER TUNING USING MACHINE LEARNING

(71) Applicant: Tektronix, Inc., Beaverton, OR (US)

(72) Inventors: Evan Douglas Smith, Portland, OR (US); John J. Pickerd, Hillsboro, OR (US); Williams Fabricio Flores Yepez, Pittsburg, PA (US); Heike Tritschler, Louisville, CO (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 17/701,411

(22) Filed: Mar. 22, 2022

(65) Prior Publication Data
US 2022/0311514 A1    Sep. 29, 2022

Related U.S. Application Data

(60) Provisional application No. 63/165,698, filed on Mar. 24, 2021.

(51) Int. Cl.
*H04B 10/07* (2013.01)
*H04B 10/077* (2013.01)
(Continued)

(52) U.S. Cl.
CPC ..... *H04B 10/0795* (2013.01); *H04B 10/0771* (2013.01); *H04B 10/0775* (2013.01);
(Continued)

(58) Field of Classification Search
CPC ............ H04B 10/0795; H04B 10/0771; H04B 10/0775; H04B 10/0777; H04B 10/0779;
(Continued)

(56) References Cited

U.S. PATENT DOCUMENTS 5,272,723 A    12/1993 Kimoto
5,397,981 A    3/1995 Wiggers
(Continued)

FOREIGN PATENT DOCUMENTS

CN    107342810    11/2019
EP    2743710    9/2018
(Continued)

OTHER PUBLICATIONS

Varughese et al., Accelerating TDECQ Assessments using Convolutional Neural Networks, Mar. 2020, OFC, All Document. (Year: 2020).*
(Continued)

*Primary Examiner* — Dibson J Sanchez
(74) *Attorney, Agent, or Firm* — Miller Nash LLP; Andrew J. Harrington

(57) ABSTRACT

A test and measurement device has a connection to allow the test and measurement device to connect to an optical transceiver, one or more processors, configured to execute code that causes the one or more processors to: initially set operating parameters for the optical transceiver to average parameters, acquire a waveform from the optical transceiver, measure the acquired waveform and determine if operation of the transceiver passes or fails, send the waveform and the operating parameters to a machine learning system to obtain estimated parameters if the transceiver fails, adjust the operating parameters based upon the estimated parameters, and repeat the acquiring, measuring, sending, and adjusting as needed until the transceiver passes. A method to tune optical transceivers includes connecting a transceiver to a test and measurement device, setting operating parameters for the transceiver to an average set of parameters, acquiring a waveform from the transceiver, measuring the waveform to determine if the transceiver passes or fails, sending the
(Continued)

waveform and operating parameters to a machine learning system when the transceiver fails, using the machine learning system to provide adjusted operating parameters, setting the operating parameters to the adjusted parameters, and repeating the acquiring, measuring, sending, using, and setting until the transceiver passes.

12 Claims, 5 Drawing Sheets

(51) Int. Cl.
| | |
|---|---|
| *H04B 10/079* | (2013.01) |
| *G06N 20/00* | (2019.01) |
| *H04B 10/40* | (2013.01) |
| *H04B 10/564* | (2013.01) |
| *H04B 10/572* | (2013.01) |
| *H04B 10/58* | (2013.01) |

(52) U.S. Cl.
CPC ......... *H04B 10/0777* (2013.01); *G06N 20/00* (2019.01); *H04B 10/07* (2013.01); *H04B 10/40* (2013.01); *H04B 10/564* (2013.01); *H04B 10/572* (2013.01); *H04B 10/58* (2013.01)

(58) Field of Classification Search
CPC .... H04B 10/40; H04B 10/0731; H04B 10/07; H04B 10/564; H04B 10/572; H04B 10/58; G02B 6/42; G06N 20/00
USPC ................ 398/9–38, 135–139, 182–201
See application file for complete search history.

(56) References Cited

U.S. PATENT DOCUMENTS

| | | | |
|---|---|---|---|
| 5,594,655 A | 1/1997 | Berchin | |
| 7,181,146 B1* | 2/2007 | Yorks ................. | H04B 10/0799 398/25 |
| 7,298,463 B2* | 11/2007 | French .................. | H04B 10/07 356/73.1 |
| 8,583,395 B2 | 11/2013 | Dybsetter | |
| 8,861,578 B1 | 10/2014 | Lusted | |
| 9,059,803 B2 | 6/2015 | Detofsky | |
| 9,337,993 B1 | 5/2016 | Lugthart | |
| 9,548,858 B1 | 1/2017 | Cirit | |
| 9,699,009 B1 | 7/2017 | Ainspan | |
| 10,171,161 B1* | 1/2019 | Côté ................. | H04B 10/6161 |
| 10,236,982 B1* | 3/2019 | Zhuge ................. | H04B 10/073 |
| 10,270,527 B1* | 4/2019 | Mentovich ....... | H04B 10/07955 |
| 10,396,897 B1 | 8/2019 | Malave | |
| 10,585,121 B2 | 3/2020 | Absher | |
| 10,727,973 B1* | 7/2020 | Kumar .................... | H04L 45/64 |
| 10,852,323 B2 | 12/2020 | Schaefer | |
| 10,863,255 B2 | 12/2020 | Zhang | |
| 11,005,697 B2 | 5/2021 | Liston | |
| 11,040,169 B2 | 6/2021 | Jung | |
| 11,095,314 B2 | 8/2021 | Medard | |
| 11,177,986 B1 | 11/2021 | Ganesan | |
| 11,233,561 B1 | 1/2022 | O'Shea | |
| 11,237,190 B2 | 2/2022 | Rule | |
| 11,336,378 B2 | 5/2022 | Buttoni | |
| 11,388,081 B1 | 7/2022 | Sommers | |
| 11,476,967 B2 | 10/2022 | Geng | |
| 11,695,601 B2 | 7/2023 | Sudhakaran | |
| 2002/0063553 A1 | 5/2002 | Jungerman | |
| 2003/0053170 A1* | 3/2003 | Levinson ............... | H04B 10/40 398/139 |
| 2003/0220753 A1 | 11/2003 | Pickerd | |
| 2004/0032889 A1* | 2/2004 | Hidaka ................. | H01S 5/0683 372/38.02 |
| 2004/0121733 A1 | 6/2004 | Peng | |
| 2004/0131365 A1* | 7/2004 | Lee ...................... | H04B 10/504 398/197 |
| 2004/0136422 A1* | 7/2004 | Mahowald ........... | H04B 10/564 372/38.02 |
| 2004/0165622 A1* | 8/2004 | Lu ........................ | H04B 10/564 372/29.021 |
| 2004/0236527 A1 | 11/2004 | Felps | |
| 2005/0222789 A1 | 10/2005 | West | |
| 2005/0246601 A1 | 11/2005 | Waschura | |
| 2005/0249252 A1* | 11/2005 | Sanchez ............. | H01S 5/06832 372/38.07 |
| 2006/0120720 A1* | 6/2006 | Hauenschild ........ | H04B 10/564 398/38 |
| 2008/0126001 A1 | 5/2008 | Murray | |
| 2008/0159737 A1* | 7/2008 | Noble ................. | H04B 10/0773 398/16 |
| 2008/0212979 A1* | 9/2008 | Ota ...................... | H04B 10/572 398/183 |
| 2009/0040335 A1 | 2/2009 | Ito | |
| 2011/0085793 A1* | 4/2011 | Oomori .................. | H04B 10/40 398/43 |
| 2011/0161738 A1* | 6/2011 | Zhang .................... | H04B 10/58 714/E11.029 |
| 2011/0286506 A1 | 11/2011 | Libby | |
| 2013/0046805 A1 | 2/2013 | Smith | |
| 2014/0093233 A1* | 4/2014 | Gao ..................... | H04B 10/0799 398/16 |
| 2014/0343883 A1 | 11/2014 | Libby | |
| 2015/0003505 A1 | 1/2015 | Lusted | |
| 2015/0055694 A1 | 2/2015 | Juenemann | |
| 2015/0207574 A1 | 7/2015 | Schoen | |
| 2016/0191168 A1 | 6/2016 | Huang | |
| 2016/0328501 A1 | 11/2016 | Chase | |
| 2018/0006721 A1* | 1/2018 | Ishizaka ........... | H04B 10/07955 |
| 2018/0074096 A1 | 3/2018 | Absher | |
| 2018/0204117 A1 | 7/2018 | Brevdo | |
| 2019/0038387 A1 | 2/2019 | Chu | |
| 2019/0278500 A1 | 9/2019 | Lakshmi | |
| 2019/0332941 A1 | 10/2019 | Towal | |
| 2019/0370158 A1 | 12/2019 | Rivoir | |
| 2019/0370631 A1 | 12/2019 | Fais | |
| 2020/0035665 A1 | 1/2020 | Chuang | |
| 2020/0057824 A1 | 2/2020 | Yeh | |
| 2020/0166546 A1 | 5/2020 | O'Brien | |
| 2020/0195353 A1* | 6/2020 | Ye ........................ | H04B 10/272 |
| 2020/0229206 A1 | 7/2020 | Badic | |
| 2020/0313999 A1 | 10/2020 | Lee | |
| 2020/0335029 A1* | 10/2020 | Gao ..................... | G06F 3/0412 |
| 2021/0041499 A1 | 2/2021 | Ghosal | |
| 2021/0105548 A1* | 4/2021 | Ye ....................... | H04Q 11/0005 |
| 2021/0111794 A1* | 4/2021 | Huang ............... | H04B 10/2507 |
| 2021/0160109 A1 | 5/2021 | Seol | |
| 2021/0167864 A1 | 6/2021 | Razzell | |
| 2021/0314081 A1 | 10/2021 | Shattil | |
| 2021/0389373 A1 | 12/2021 | Pickerd | |
| 2021/0390456 A1 | 12/2021 | Pickerd | |
| 2022/0070040 A1 | 3/2022 | Namgoong | |
| 2022/0076715 A1 | 3/2022 | Lee | |
| 2022/0121388 A1 | 4/2022 | Woo | |
| 2022/0182139 A1* | 6/2022 | Zhang .................. | H04B 10/524 |
| 2022/0199126 A1 | 6/2022 | Lee | |
| 2022/0200712 A1 | 6/2022 | Lillie | |
| 2022/0215865 A1 | 7/2022 | Woo | |
| 2022/0236326 A1 | 7/2022 | Schaefer | |
| 2022/0239371 A1* | 7/2022 | Xu ..................... | H04B 10/6165 |
| 2022/0247648 A1 | 8/2022 | Pickerd | |
| 2022/0311513 A1 | 9/2022 | Pickerd | |
| 2022/0334180 A1 | 10/2022 | Pickerd | |
| 2022/0373597 A1 | 11/2022 | Agoston | |
| 2022/0373598 A1 | 11/2022 | Tan | |
| 2022/0385374 A1 | 12/2022 | Arikawa | |
| 2022/0390515 A1 | 12/2022 | Pickerd | |
| 2022/0407595 A1* | 12/2022 | Varughese ......... | H04B 10/0731 |
| 2023/0050162 A1 | 2/2023 | Tan | |
| 2023/0052588 A1 | 2/2023 | Sudhakaran | |

(56) References Cited

U.S. PATENT DOCUMENTS

2023/0088409 A1    3/2023   Parsons
2023/0098379 A1    3/2023   Smith

FOREIGN PATENT DOCUMENTS

| EP | 3936877 | 1/2022 |
| JP | 6560793 | 8/2019 |
| WO | 2021092156 | 5/2021 |
| WO | 2022171645 | 8/2022 |
| WO | 2022189613 | 9/2022 |

OTHER PUBLICATIONS

Varughese, Siddarth, et al., Accelerating Assessments of Optical Components Using Machine Learning: TDECQ as Demonstrated Example, Journal of Lightwave Technology, Jan. 1, 2021, pp. 64-72, vol. 39, No. 1, IEEE.
Watts et al., "Performance of Single-Mode Fiber Links Using Electronic Feed-Forward and Decision Feedback Equalizers", 2005, IEEE Photonics Techology Letters, vol. 17, No. 10, pp. 2206-2208 (Year: 2005).
Echeverri-Chacon et al., "Transmitter and Dispersion Eye Closure Quaternary (TDECQ) and Its Sensitivity to Impairments in PAM4 Waveforms", 2019, Journal of Lightwave Technology, vol. 37, No. 3, pp. 852-860 (Year: 2019).
Wang et al., "Intelligent Constellation Diagram Analyzer Using Convolutional Neural Network-Based Deep Learning," Optics Express, Jul. 24, 2017, vol. 25, No. 15.

\* cited by examiner

OPTICAL TRANSCEIVER TUNING USING MACHINE LEARNING

RELATED APPLICATIONS

This disclosure claims benefit of U.S. Provisional Patent Application No. 63/165,698 titled "OPTICAL TRANSMITTER TUNING USING MACHINE LEARNING," filed Mar. 24, 2021, which is incorporated herein in its entirety.

TECHNICAL FIELD

This disclosure relates to test and measurement systems, and more particularly to systems and methods for optical transceiver tuning, for example, during manufacturing.

BACKGROUND

Manufacturers of optical transceiver may take up to two hours to tune their optical transceiver, as a worst case example. They typically accomplish this by sweeping the tuning parameters. In some cases, it may take 200 iterations worst case, and three to five iterations best case. Speeding up this process to reduce the number of iterations to get the transceiver tuned reducing both the time and therefore, the expense, of manufacturing.

Embodiments of the disclosed apparatus and methods address shortcomings in the prior art.

DETAILED DESCRIPTION

Figure 1:
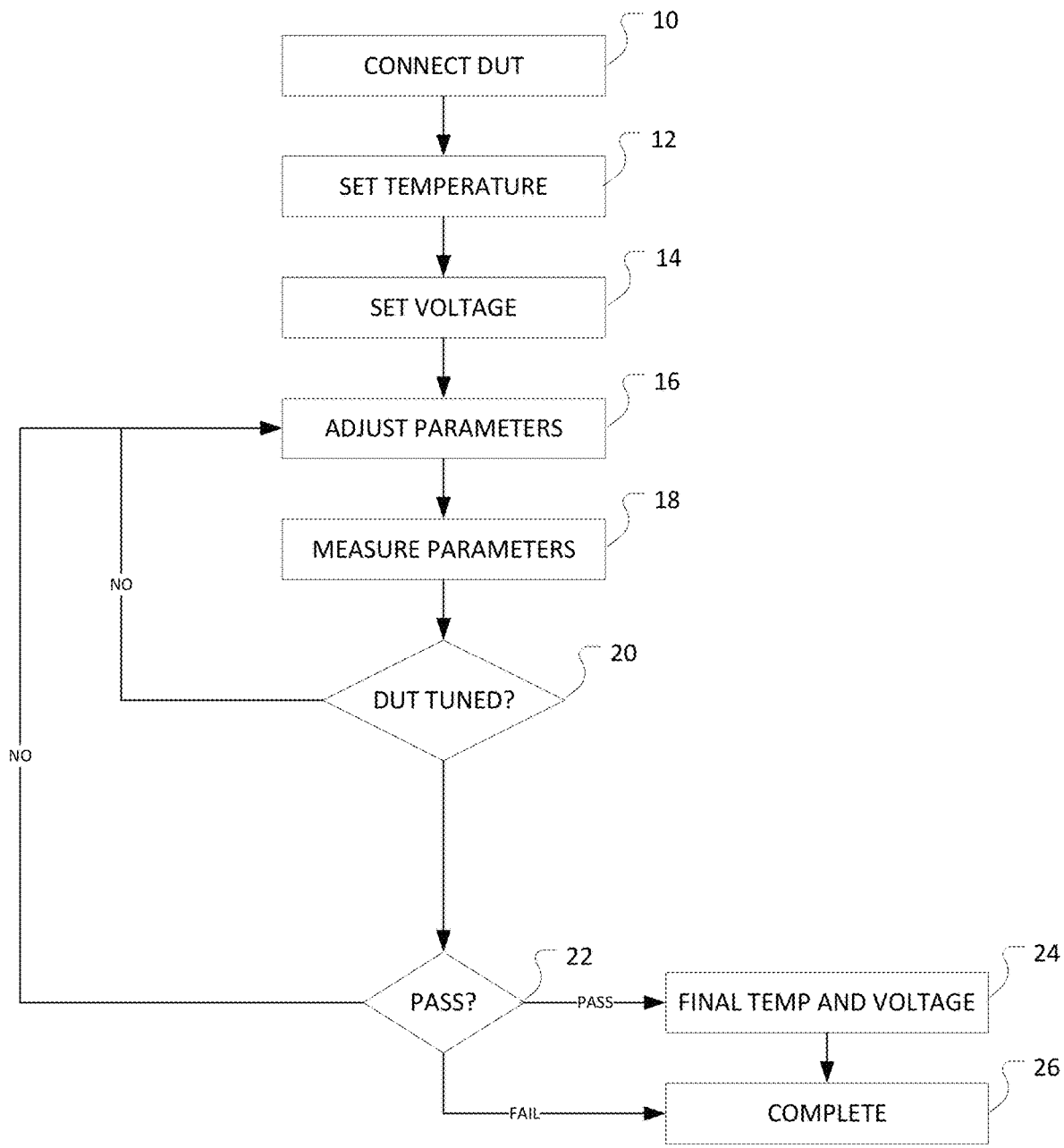
FIG. 1 shows an example of a manufacturing workflow for tuning optical transceiver parameters.

Currently, optical transceiver tuning does not employ any type of machine learning to decrease the time needed to tune and test the transceivers. The amount of time it takes to train them increases the overall costs of the transceivers. A typical manufacturer workflow is shown in FIG. 1. At 10, the user connects the optical transceiver to a test and measurement device. As used here, the term "test and measurement device" includes any device capable of performing tests and measuring the resulting operation of the optical transceiver as a device under test.

The user sets a temperature at 12 and waits until the temperature stabilizes. The user then sets the voltage at 14. The user sets the operating parameters for the DUT at 16, operates the DUT and then measures its operation. Measurement may take many forms, as will be discussed in more detail later. At 18, the system determines if the measurement indicates that the part operates within a desired range of the measured values. If it operates with the desired range or ranges, at 20, the transceiver passes at 22. The final temperature and voltage used in the test may be stored and used for the next transceiver at 24 and then the test completes for that part.

If the DUT is not tuned at 22, then the user may adjust the parameters at 16 and re-run the test back through 22. This process may be completed many times until the DUT either passes the test or fails and the test completes at 26.

This is a time intensive, and ultimately expensive, process. The embodiments here employ machine learning to both provide a more accurate starting point and to adjust the parameters more efficiently.

Figure 2:
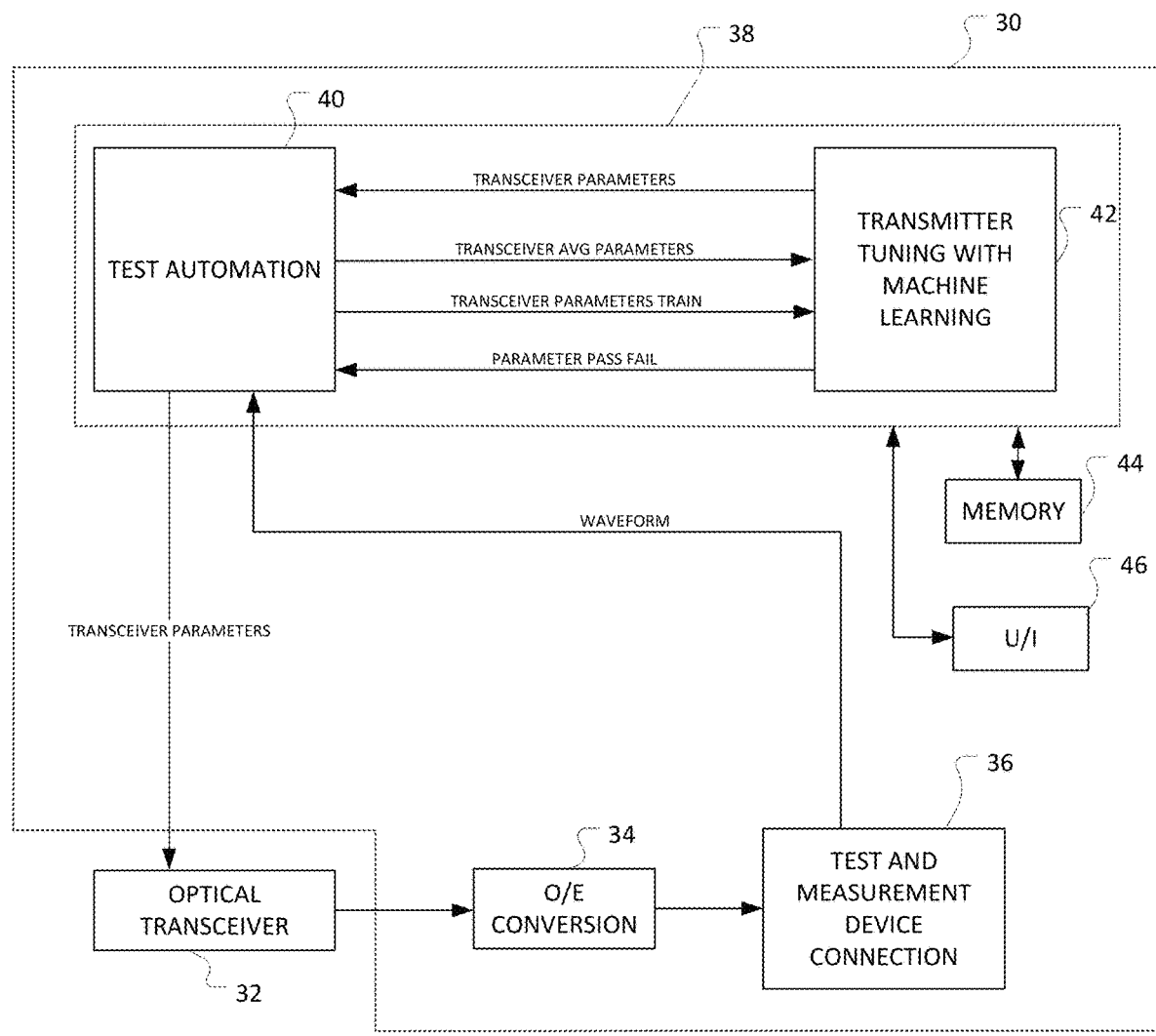
FIG. 2 shows a test and measurement device usable to tune optical transceivers.

The use of a machine learning process can decrease the amount of time needed to tune, test and determine if a part passes or fails. FIG. 2 shows an embodiment of a test and measurement system or device that uses a machine learning system to determine operating parameters for the parts. The output measurements for which the user may tune, and will be used to measure the operation, may include transmitter and dispersion eye closure penalty quaternary (TDECQ), extinction ratio, average optical power, optical modulation amplitude, level separation mismatch ratio, among others. The tuning parameters of the optical transceivers that may be changed or adjusted may include such things as bias current, modulation voltage, and others.

The test and measurement device 30 may include many different components. FIG. 2 shows one possible embodiment and may include more or fewer components. The device of FIG. 2 connects to the DUT, in this case an optical transceiver 32. The test and measurement device, such as an oscilloscope, may include an optical/electrical (O/E) conversion module 34 that connects to the test and measurement device through a connection such as 36. The processor 38 represents one or more processors and will be configured to execute code to cause the processor to perform various tasks including the manufacturer's test automation code 40. Or, the test automation code could be part of another computing device separate from the test and measurement device 30, with which the processor 38 interacts. FIG. 2 shows the machine learning system 42 as part of the test and measurement device. The machine learning system may also reside on a separate device such as a computer in communication with the test and measurement device.

For purposes of this discussion, the term "test and measurement device" as used here includes those embodiments that include an external computing device as part of the test and measurement device. The memory 44 may reside on the test and measurement device or be distributed between the test and measurement device and the computing device. As will be discussed in more detail later, the memory may contain training data and run-time data used by the machine learning system. The test and measurement device may also include a user interface 46 that may comprise one or more of a touch screen, video screen, knobs, buttons, lights, keyboard, mouse, etc.

In operation, the optical transceiver 32 connects to the test and measurement device through the O/E converter 34 and the connection 36. A test automation process 40 sends the transceiver tuning parameters to the transceiver. The transceiver parameters are received from the machine learning system 42, and may be based upon average parameters developed through testing and training. The test and measurement device acquires a waveform from the transceiver DUT and returns the waveform to the processor. The system measures the waveform and determines whether the transceiver has a pass or fail for that set of tuning parameters.

One measurement, mentioned above is TDECQ, which is using a PAM4 eye diagram. As discussed above, this comprises one of the performance measurements for which the transceiver may be tuned, with others that may include extinction ratio (ER), average optical power (AOP), optical modulation amplitude (OMA), level separation mismatch (RLM) ratio and others.

Figure 3:
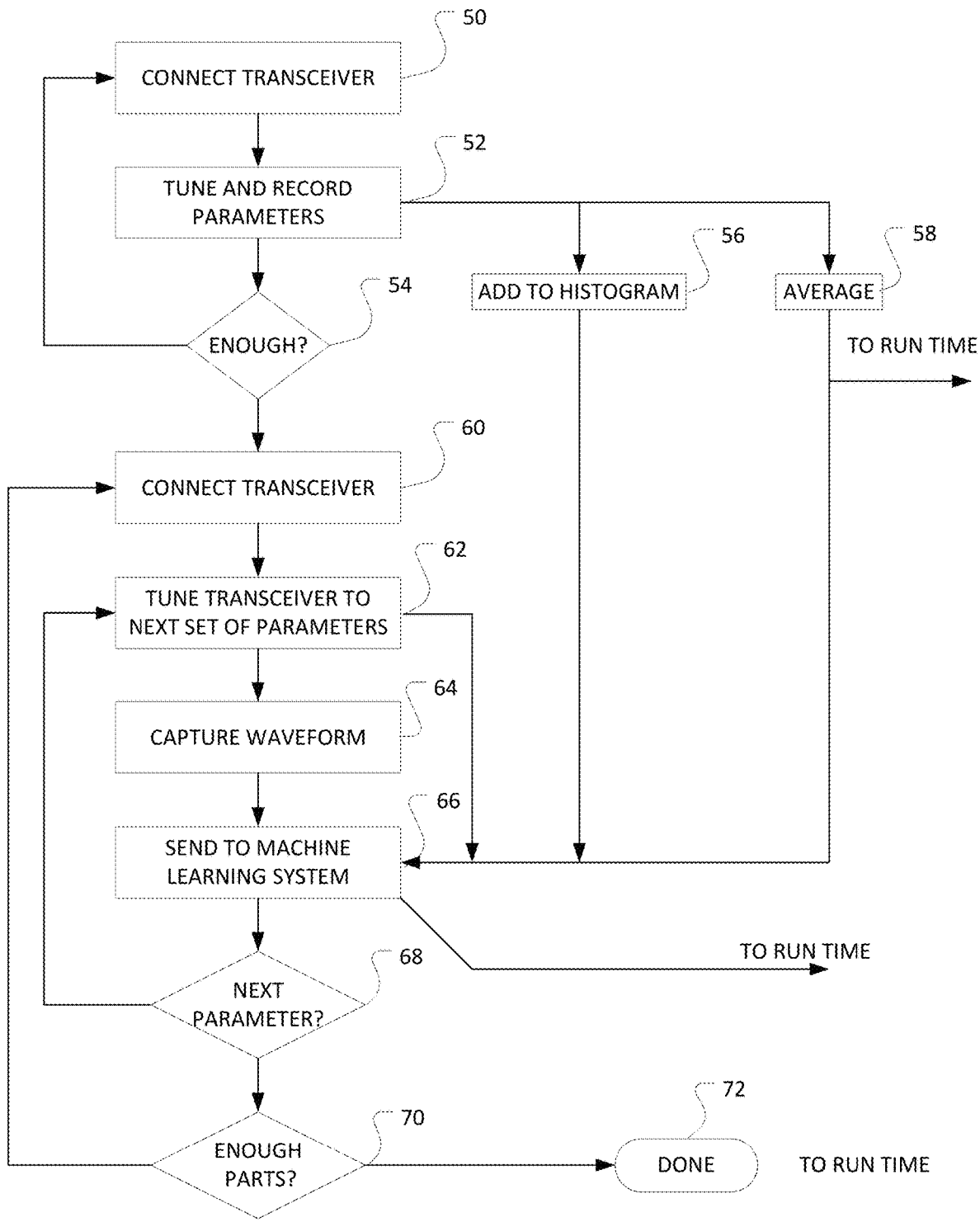
FIG. 3 shows a flowchart of an embodiment of a process to train a machine learning system for tuning optical transceivers.

The machine learning system 42 performs the run time selection and adjustment of the tuning parameters based upon its training. The training process builds a training set of tuning parameters and associated waveforms that can then inform the selection of the tuning parameters based upon the waveform acquired from the DUT. FIG. 3 shows a process of training a machine learning system that also provides starting parameters for a run-time testing process.

In the below discussion, several terms have specific meanings. In training the machine learning system, the process requires a set of parameters and associated waveforms for training. As discussed in detail below, the user optimally tunes a large number of transceivers that results in a set of parameters referred to here as "optimized parameters" and contains the optimized parameters for each of the large number of transceivers. The term "average parameters" refers to a set of parameters each of which represents the average of that particular parameter.

In a first iterative sub-process, a user connects an optical transceiver to the test and measurement device at 50. Typically, this process incudes allowing the temperature of the transceiver to stabilize. The transceiver undergoes standard tuning at 52, meaning any current tuning procedure used before the implementation of the embodiments here. Once a particular transceiver undergoes tuning to reach its tuned state, the parameters used at that state are the optimized parameter for that transceiver. The optimized parameters from each of these iterations are gathered, such as into a histogram, at 56, and an average is determined at 58.

As will be discussed in more detail with regard to FIG. 4 and the run-time environment, these averages will act as the initial starting parameters for the run-time process. This process continues until enough transceivers have undergone tuning as determined at 54. The determination of how many transmitters are enough may depend upon the architecture of the machine learning system and how many the system requires to produce accurate results.

A second iterative sub-process begins at 60. The user connects the transceiver, and lets the temperature stabilize. The transceiver undergoes tuning to a "next" set of parameters at 62, which for the first iteration comprises an initial set of parameters. The system also records these parameters to be sent to the machine learning system. Each iteration will sweep the parameters, meaning that the system adjusts each parameter to the next setting for that parameter until all settings for that parameter have completed.

The system captures the waveform at 64 for each set of parameters and will also send the waveform to the machine learning system. As part of capturing the waveform, the system may perform clock recovery and generate a partial eye diagram diagram, also known as a short pattern overlay. In one embodiment, the partial eye diagram diagram may include only single level transitions, where a single-level transition means a transition from one level only to one other level one transition from low to high, high to low, etc., such as the separated single-level partial eye diagrams described in U.S. patent application Ser. No. 17/592,437. This resulting overlay may comprise the waveform sent to the machine learning system, although the waveform may be represented in other formats or vector spaces in other embodiments. In one embodiment, as part of the waveform capture, the system also calculates a number measurements, such as TDECQ, OMA, ER, AOP, RLM, as mentioned above. At 66, the system sends the information gathered, including the histograms, averages, and the information specific to each iteration, such as the waveform, short pattern overlay, measurements, to be associated with each set of parameters to the machine learning system for processing. The machine learning system associates all of this information with the waveform to train it to identify the most accurate parameters for the next iteration. This process repeats until all of the iterations for the parameter being swept as checked at 68.

As part of the machine learning training process, the system undergoes testing and validation. The system will provide test waveforms to the machine learning system to have it generate predictions for the next set of parameters, then test those parameters to see if the machine learning system made an accurate prediction. The process of training continues until enough transceivers have undergone screening at 70 until the machine learning system produces results with a desired accuracy. Once this has been achieved, the training process completes at 72 and the system can move to run-time use. One should note that the system may return to the training process as needed, such as if the prediction accuracy drops, or some change occurs in the nature of the transceivers being tested.

Figure 4:
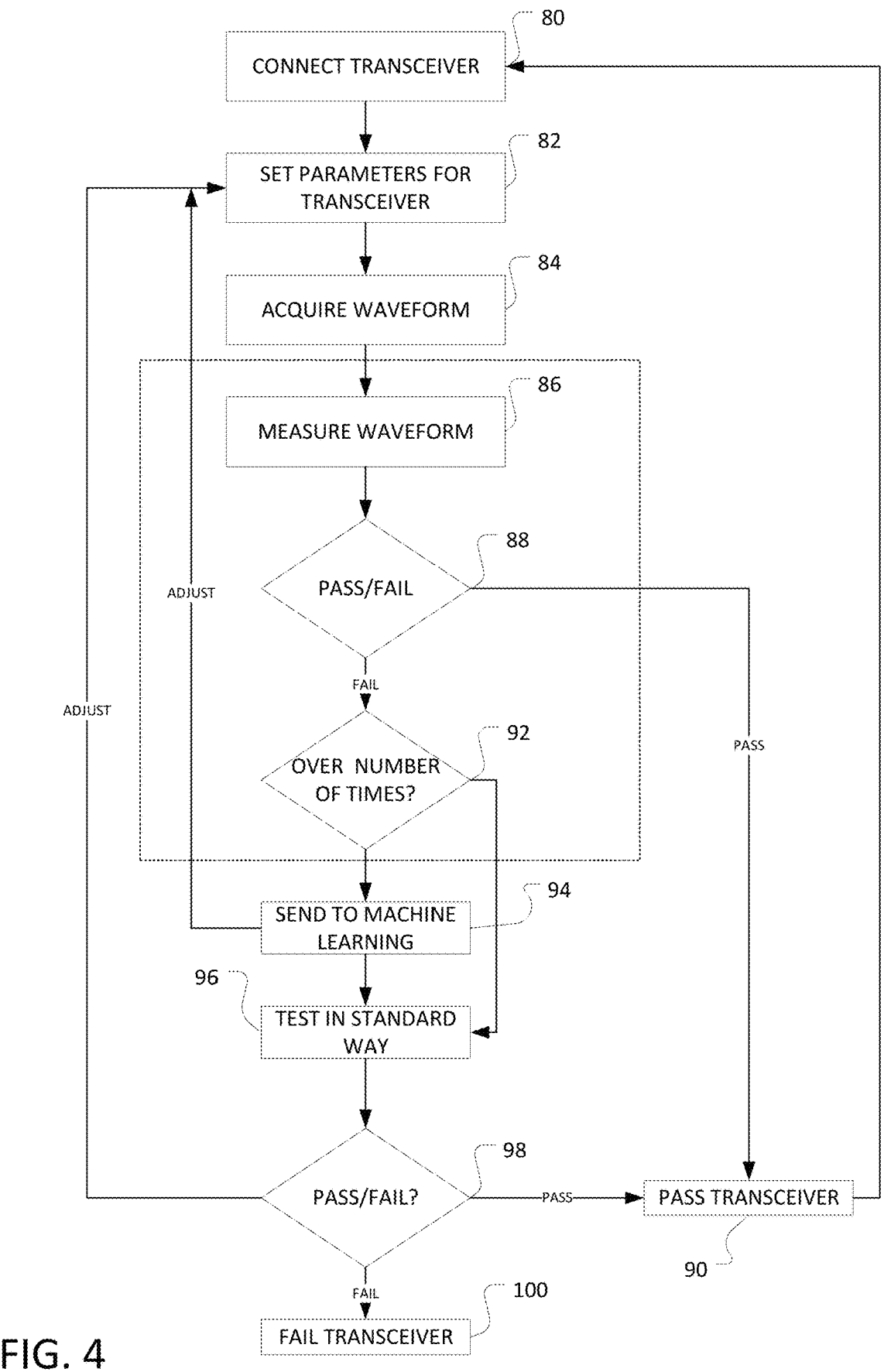
FIG. 4 shows a flowchart of an embodiment of a process to use machine learning to tune optical transceivers.

FIG. 4 shows an embodiment of a method of testing optical transceivers in the runtime environment. At 80, a user connects the transceiver to the test and measurement device and allows the temperature to stabilize. The temperature may comprise one of the adjustments made and multiple iterations may include different temperatures. The system tunes the transceiver to a set of operating parameters at 82. As used here, the term "operating parameters" means the parameters set for the transceiver. The operating parameters may change depending upon the point in the process. Initially, the process sets the operating parameters to the average parameters developed in the first part of the training process. The test and measurement device acquires a waveform from the transceiver at 84. As in the training process, this may include performing clock recovery and generating a partial eye diagram overlay with only single level transitions. The system may also perform measurements such as TDECQ, ER, AOP, OMA, RLM and others at 86. If the results indicate that the operation of the transceiver lies within a desired range at 88, the transceiver passes at 90.

Figure 5:
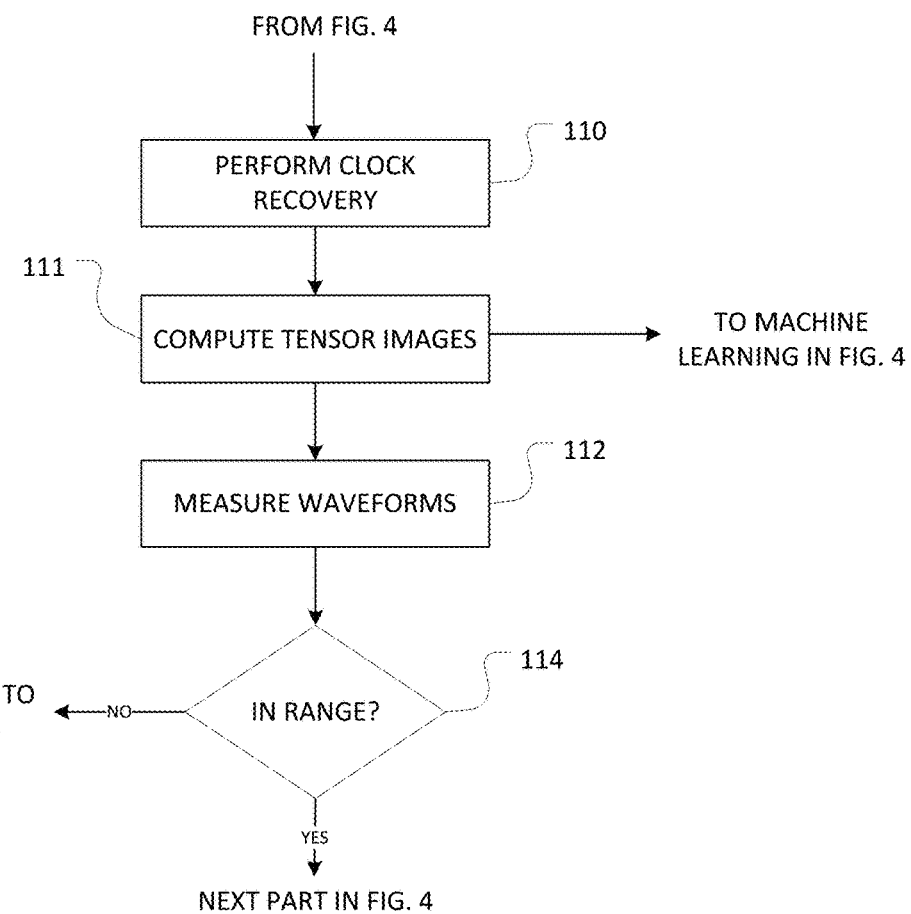
FIG. 5 shows a flowchart of an embodiment of a portion of a process to use machine learning to tune optical transceivers.
Figure 6:
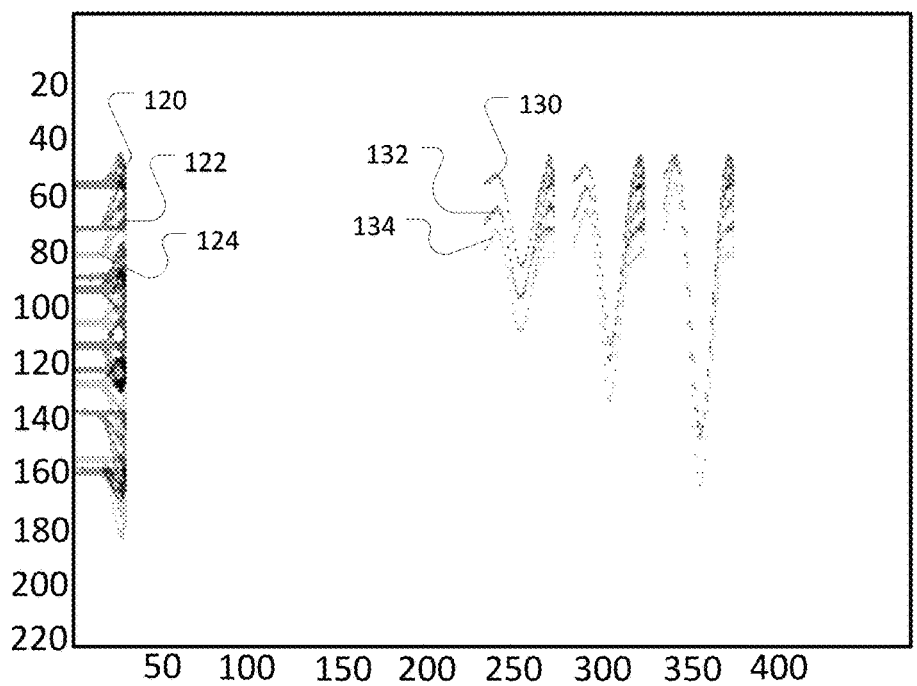
FIG. 6 shows examples of tensor images derived from waveforms for use in a machine learning system.

In one embodiment, the measurement and determination of pass fail shown in FIG. 4, the process performs clock recovery 110 and from that generates tensor images at 111, as shown in FIG. 5. An example tensor image is shown in FIG. 6. FIG. 6 shows the input waveforms on the left, with the three channels showing the input waveforms on the Red channel 120, Blue channel 122 and Green channel 124. The tensor 130 and the tensors in the same position across the figure correspond to the Red channel, the position of tensor 132 corresponds to the Blue channel, and the position of tensor 134 corresponds to the Green channel. Short pattern images created from the acquired waveform may be placed into all three color channels. Different code sequences may be placed into different color channels. Many combinations of patterns and channels are possible.

The tensor images are sent to the machine learning system as the waveform images used in the machine learning system. The process then measures the waveforms at 112 at FIG. 5 and these are then checked to see if they are in range at 114. The process then returns to FIG. 4 at 88.

Referring back to FIG. 3, for this embodiment, this process of capturing the waveform, would include generating an image and tensors to be used in the machine learning system. The machine learning system would be trained with these types of tensor images. This allows the system to use the tensor images in the machine learning system at runtime.

If the results show that the transceiver does not operate within the desired range of whatever measurement(s) used, the transceiver fails. The system may check to see how many times the transceiver has undergone the process at 92. If the number of times is under a predetermined number, the results are sent to the machine learning system at 94 for determination of a next set of operating parameters. The machine learning system then provides estimated parameters for the next iteration. In one embodiment, the operating parameters for the transceiver in the next iteration comprise "adjusted parameters" resulting from subtracting the estimated parameters from the previous operating parameters to find a difference, and then adding the difference back to the average parameters to produce new operating parameters.

Returning to 92, if the machine learning process has repeated a number of times and the transceiver continues to fail, the system uses the "standard" procedure for tuning at 96. This comprises any tuning procedure previously used prior to the implementation of the embodiments here. The process then continues until the operation of the transceiver meets the desired measurements and at 98 and the transceiver passes at 90. However, if even after the standard tuning process, the transceiver cannot be adjusted to operate within the desired range, the transceiver is failed at 100.

In this manner, a machine learning system can increase the efficiency of the tuning process. This allows the system to pass or fail the transceivers more quickly and reduces both the time and expense of the manufacturing process.

Aspects of the disclosure may operate on a particularly created hardware, on firmware, digital signal processors, or on a specially programmed general purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

EXAMPLES

Illustrative examples of the disclosed technologies are provided below. An embodiment of the technologies may include one or more, and any combination of, the examples described below.

Example 1 is a method to tune optical transceivers, comprising: connecting a transceiver to a test and measurement device; setting operating parameters for the transceiver to an average set of parameters; acquiring a waveform from the transceiver; measuring the waveform to determine if the transceiver passes or fails; sending the waveform and operating parameters to a machine learning system when the transceiver fails; using the machine learning system to provide adjusted operating parameters; setting the operating parameters to the adjusted parameters; and repeating the acquiring, sending, using, and setting until the transceiver passes.

Example 2 is the method of Example 1, further comprising setting a temperature for the transceiver.

Example 3 is the method of Example 2, further comprising repeating the method multiple times each for a different temperature.

Example 4 is the method of any of Examples 1 through 3, wherein providing adjusted operating parameters comprises: subtracting estimated parameters provided from the machine learning system from the operating parameters to find a difference; and adding the difference to the operating parameters to produce new operating parameters.

Example 5 is the method of any of Examples 1 through 4, further comprising completing testing of the transceiver if the transceiver passes.

Example 6 is the method of any of Examples 1 through 5, wherein repeating the acquiring and sending comprises: repeating the acquiring and sending until a predetermined number of times has been reached without the transceiver passing; and testing the transceiver using a different method.

Example 7 is the method of any of Examples 1 through 6, wherein the waveform is represented as an eye diagram consisting of single-level transitions.

Example 8 is of any of Examples 1 through 7, wherein measuring the waveform comprises measuring a transmitter dispersion eye closure quaternary (TDECQ) value.

Example 9 is a test and measurement device, comprising: a connection to allow the test and measurement device to connect to an optical transceiver; and one or more processors, configured to execute code that causes the one or more processors to: initially set operating parameters for the optical transceiver to average parameters; acquire a waveform from the optical transceiver; measure the acquired waveform and determine if operation of the transceiver passes or fails; send the waveform and the operating parameters to a machine learning system to obtain estimated parameters if the transceiver fails; adjust the operating parameters based upon the estimated parameters; and repeat the acquiring, measuring, sending, and adjusting as needed until the transceiver passes.

Example 10 is the device of Example 9, wherein the one or more processors are further configured to execute code to cause the one or more processors to set a temperature for the transceiver.

Example 11 is the device of Example 10, wherein the one or more processors are further configured to cause the one or more processors to repeat the execution of the code multiple times each for a different temperature.

Example 12 is the device of Example 10, wherein the code to cause the one or more processors to adjust the operating parameters comprises code to cause the one or more processors to subtract the estimated parameters from the operating parameters to find a difference, and add the difference to the average parameters to produce new operating parameters.

Example 13 is a method of training a machine learning system to determine operating parameters for optical transceivers, comprising: connecting the transceiver to a test and measurement device; tuning the transceiver with a set of parameters; capturing a waveform from the transceiver; sending the waveform and the set of parameters to a machine learning system; and repeating the tuning, capturing and sending until a sufficient number of samples are gathered.

Example 14 is the method of Example 13, further comprising: setting a temperature for the transceiver; waiting until the temperature stabilizes; and recording the parameters.

Example 15 is the method of Example 14, further comprising adding the set of parameters to a histogram of parameters for the temperature.

Example 16 is the method of Example 14, further comprising adding the set of parameters to a histogram of parameters for the temperature.

Example 17 is the method of Example 14, further comprising repeating the setting, waiting and recording until a sufficient number of samples are gathered.

Example 18 is the method of any of Examples 13 through 17, wherein capturing the waveform further comprises generating an eye diagram overlay containing only single-level transitions.

Example 19 is the method of any of Examples 13 through 18, wherein the repeating occurs after changing the parameters to sweep a range for each parameter in the set of parameters.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although specific embodiments have been illustrated and described for purposes of illustration, it will be understood that various modifications may be made without departing from the spirit and scope of the disclosure. Accordingly, the invention should not be limited except as by the appended claims.

The invention claimed is:

1. A method to tune optical transceivers, comprising:
connecting a transceiver to a test and measurement device;
setting operating parameters for the transceiver to an average set of parameters;
acquiring a waveform from the transceiver;
measuring the waveform to determine if the transceiver passes or fails;
sending the waveform and operating parameters to a machine learning system when the transceiver fails;
using the machine learning system to provide adjusted operating parameters;
setting the operating parameters for the transceiver to the adjusted parameters; and
repeating the acquiring, measuring, sending, using, and setting until the transceiver passes.

2. The method as claimed in claim 1, further comprising setting a temperature for the transceiver.

3. The method as claimed in claim 2, further comprising repeating the method multiple times each for a different temperature.

4. The method as claimed in claim 1, wherein providing adjusted operating parameters comprises:
subtracting estimated parameters provided from the machine learning system from the operating parameters to find a difference; and
adding the difference to the operating parameters to produce new operating parameters.

5. The method as claimed in claim 1, further comprising completing testing of the transceiver if the transceiver passes.

6. The method as claimed in claim 1, wherein repeating the acquiring and sending comprises:
repeating the acquiring and sending until a predetermined number of times has been reached without the transceiver passing; and
testing the transceiver using a different method.

7. The method as claimed in claim 1, wherein the waveform is represented as an eye diagram consisting of single-level signal transitions.

8. The method as claimed in claim 1, wherein measuring the waveform comprises measuring a transmitter dispersion eye closure quaternary (TDECQ) value.

9. A test and measurement device, comprising:
a connection to allow the test and measurement device to connect to an optical transceiver; and
one or more processors, configured to execute code that causes the one or more processors to:
   initially set operating parameters for the optical transceiver to average parameters;
   acquire a waveform from the optical transceiver;
   measure the acquired waveform and determine if operation of the optical transceiver passes or fails;
   send the waveform and the operating parameters to a machine learning system to obtain estimated parameters if the optical transceiver fails;
   adjust the operating parameters in the optical transceiver based upon the estimated parameters; and
   repeat the acquiring, measuring, sending, and adjusting as needed until the optical transceiver passes.

10. The device as claimed in claim 9, wherein the one or more processors are further configured to execute code to cause the one or more processors to set a temperature for the optical transceiver.

11. The device as claimed in claim 10, wherein the one or more processors are further configured to cause the one or more processors to repeat the execution of the code multiple times each for a different temperature.

12. The device as claimed in claim 10, wherein the code to cause the one or more processors to adjust the operating parameters comprises code to cause the one or more processors to subtract the estimated parameters from the operating parameters to find a difference, and add the difference to the average parameters to produce new operating parameters.

* * * * *